(12) United States Patent
Arakawa

(10) Patent No.: US 11,310,026 B2
(45) Date of Patent: Apr. 19, 2022

(54) COMMUNICATION SYSTEM, COMMUNICATION DEVICE, AND PROGRAM

(71) Applicant: Mitsubishi Electric Corporation, Tokyo (JP)

(72) Inventor: Satoshi Arakawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/310,220

(22) PCT Filed: Mar. 28, 2019

(86) PCT No.: PCT/JP2019/013805
§ 371 (c)(1),
(2) Date: Jul. 27, 2021

(87) PCT Pub. No.: WO2020/194714
PCT Pub. Date: Oct. 1, 2020

(65) Prior Publication Data
US 2022/0085968 A1  Mar. 17, 2022

(51) Int. Cl.
*H04L 7/00* (2006.01)
*H04J 3/06* (2006.01)
*H04W 56/00* (2009.01)

(52) U.S. Cl.
CPC .......... *H04L 7/0016* (2013.01); *H04J 3/0638* (2013.01); *H04J 3/0685* (2013.01);
(Continued)

(58) Field of Classification Search
None
See application file for complete search history.

(56) References Cited

U.S. PATENT DOCUMENTS

2013/0343365 A1* 12/2013 Hollabaugh .............. G06F 1/12
370/338
2020/0106542 A1* 4/2020 Liu .......................... G06F 1/10
(Continued)

FOREIGN PATENT DOCUMENTS

JP       3-189703 A    8/1991
JP    2000-235406 A    8/2000
(Continued)

OTHER PUBLICATIONS

International Search Report and Written Opinion dated Jun. 25, 2019, received for PCT Application PCT/JP2019/013805, Filed on Mar. 28, 2019, 9 pages including English Translation.
(Continued)

*Primary Examiner* — Anh Vu H Ly
(74) *Attorney, Agent, or Firm* — Xsensus LLP

(57) ABSTRACT

A communication system (1000) includes communication devices (10, 20) to share common time after correction of synchronization error including a communication delay with each other via a network (400). The communication device (10) includes a set time acquirer to acquire set time set by a user, a setter to set the set time as first system time, which is system time of the communication device (10), and a time difference data transmitter to transmit time difference data, which indicates a time difference between the common time and the set time, to the communication device (20). The communication device (20) includes a time difference data receiver to receive the time difference data, and a setter to set the sum of the common time and the time difference indicated by the time difference data as second system time, which is system time of the communication device (20).

7 Claims, 14 Drawing Sheets

(52) U.S. Cl.
CPC .......... *H04J 3/0694* (2013.01); *H04J 3/0697* (2013.01); *H04W 56/001* (2013.01)

(56) References Cited

U.S. PATENT DOCUMENTS

2020/0259896 A1* 8/2020 Sachs ............... G06K 19/06028
2021/0219253 A1* 7/2021 Van Phan ......... H04W 56/0055

FOREIGN PATENT DOCUMENTS

| JP | 2003-66170 A | 3/2003 |
| JP | 2006-276958 A | 10/2006 |
| JP | 2011-216085 A | 10/2011 |
| JP | 2018-22947 A | 2/2018 |
| JP | 2018-157462 A | 10/2018 |

OTHER PUBLICATIONS

Decision to Grant dated Apr. 14, 2020, received for JP Application 2020-504041, 5 pages including English Translation.

* cited by examiner

FIG.6

| SET VALUE OF SYSTEM TIME | TRIGGER |
|---|---|
| DECEMBER 25, 2018, 15:40 AND 50.789 SECONDS | BE APPLIED TO CURRENT TIME |

COMMUNICATION SYSTEM, COMMUNICATION DEVICE, AND PROGRAM

CROSS-REFERENCE TO RELATED APPLICATION

The present application is based on PCT filing PCT/JP2019/013805, filed Mar. 28, 2019, the entire contents of which are incorporated herein by reference.

TECHNICAL FIELD

The present disclosure relates to a communication system, a communication device, and a program.

BACKGROUND ART

Some facilities, represented by factories, employ systems each controlling multiple machines via a communication network. Such systems require exact cooperation of the machines. In order to satisfy this requirement, some techniques are proposed for time synchronization between machines on the communication network (for example, refer to Patent Literature 1).

Patent Literature 1 discloses a system in which times to be synchronized between multiple controllers can be selected in multiple methods. In a first method, the time synchronization is achieved by transmission of time data from a personal computer (PC) via a network to the controllers. In a second method, the time synchronization is achieved by introduction of standard time data of a global positioning system (GPS) from a standard time receiver via a dedicated cable into the controllers. This system enables the controllers to individually select the time from the PC or the highly accurate standard time.

CITATION LIST

Patent Literature

Patent Literature 1: Unexamined Japanese Patent Application Publication No. 2006-276958

SUMMARY OF INVENTION

Technical Problem

Also required is to allow a user of the system for controlling machines to set system time serving as a reference for operation of the system. For example, the user needs to arbitrarily set time as required, in the case where the user desires to stop measurement of system time during a temporal halt of the system, the case where the user desires to adjust system time to another time different from the system time, or the case where the user desires to shift system time back to time in the past for appropriate management of the system.

In the technique disclosed in Patent Literature 1, the user cannot change the standard time of the GPS but can arbitrarily set the time at the PC. Unfortunately, in the case where a high accuracy of time measurement is required, the user is not allowed to set the time because the time from the PC has lower accuracy than that of the standard time. The times to be synchronized for use in the system should therefore have improved convenience.

An objective of the disclosure, which has been accomplished in view of the above situations, is to improve the convenience of times to be synchronized for use in the system.

Solution to Problem

In order to achieve the above objective, a communication system according to the disclosure includes a first communication device and a second communication device to share common time after correction of synchronization error including a communication delay with each other via a network. The first communication device includes: acquisition means for acquiring set time set by a user; first setting means for setting the set time as first system time, which is system time of the first communication device; and time-difference-data transmission means for transmitting time difference data, which indicates a time difference between the common time and the set time, to the second communication device. The second communication device includes: time-difference-data reception means for receiving the time difference data; and second setting means for setting the sum of the common time and the time difference indicated by the time difference data as second system time, which is system time of the second communication device.

Advantageous Effects of Invention

According to the disclosure, the first communication device and the second communication device share common time with each other via a network. The first communication device includes the first setting means for setting the set time set by the user as the first system time, and the time-difference-data transmission means for transmitting the time difference data. The second communication device includes the second setting means for setting the sum of the common time and the time difference indicated by the time difference data as the second system time. This configuration enables the user to arbitrarily set the set time as required and achieves synchronization of the first system time of the first communication device and the second system time of the second communication device, which are set on the basis of the set time. The configuration can thus improve the convenience of times to be synchronized for use in the system.

BRIEF DESCRIPTION OF DRAWINGS

FIG. 6 illustrates exemplary information containing a set value according to the embodiment;

DESCRIPTION OF EMBODIMENTS

A communication system 1000 according to an embodiment of the disclosure is described in detail with reference to the accompanying drawings. To share and synchronize times in multiple devices means to synchronize the clocks included in the individual devices. The times in multiple devices are synchronized when the identical times are measured by the clocks included in the individual devices and thus shared by the devices.

EMBODIMENT

Figure 1:
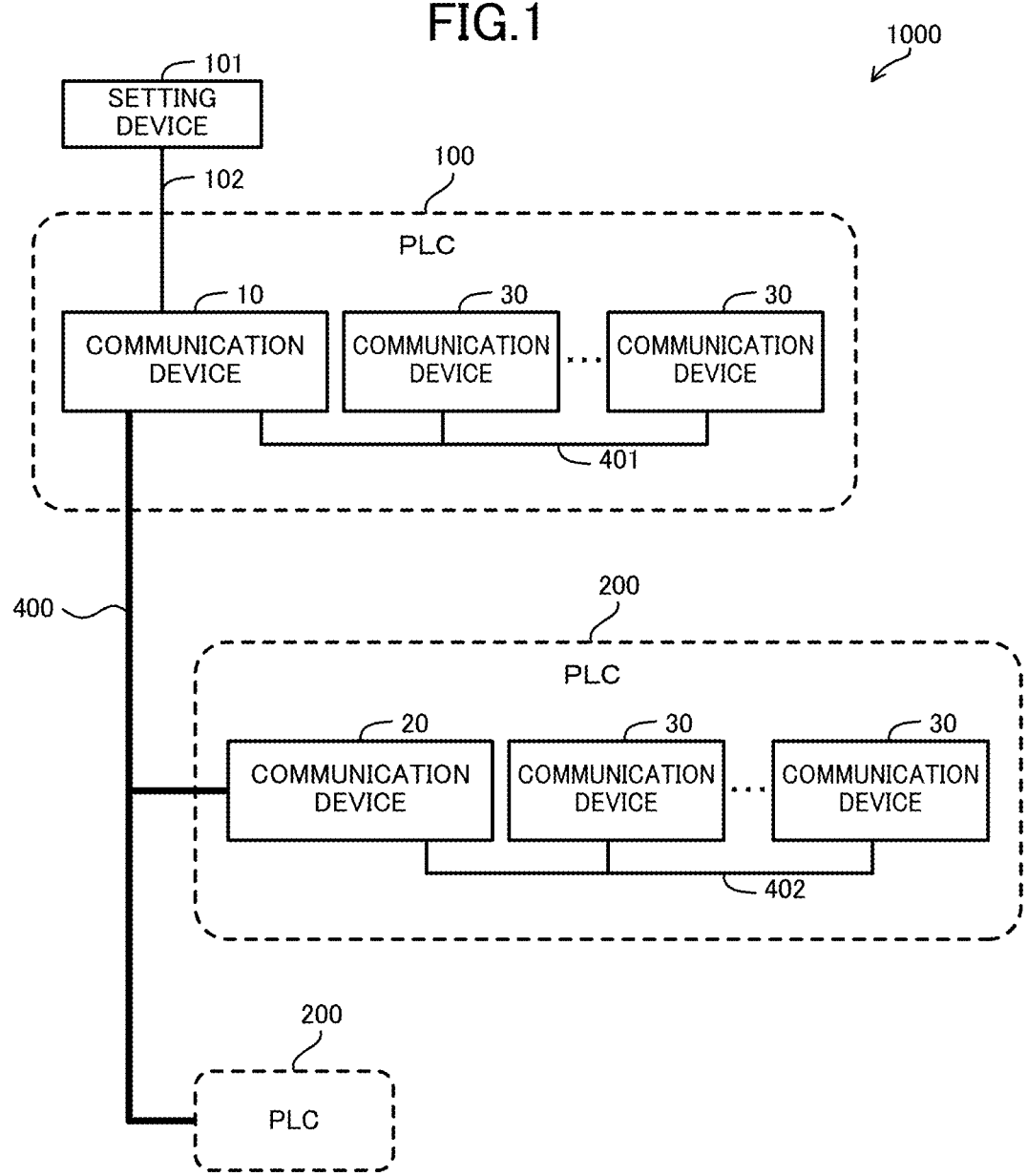
FIG. 1 illustrates a configuration of a communication system according to an embodiment of the disclosure.

The communication system 1000 according to the embodiment corresponds to a part of an FA system installed in a factory. The communication system 1000 is configured by connecting the machines, which constitute a production system, inspection system, processing system, or another system as an FA system, to each other via communication paths. With reference to FIG. 1, the communication system 1000 includes a setting device 101 for setting time and programmable logic controllers (PLCs) 100 and 200, which are industrial controllers.

The setting device 101 is a computer terminal including a user interface. Examples of the setting device 101 include an industrial personal computer (IPC) and a tablet terminal. The setting device 101 is connected to the PLC 100 via a transmission line 102. The transmission line 102 may be a communication line, represented by a universal serial bus (USB), or may be a wireless communication path, for example.

The PLCs 100 and 200 serve to control machines, which are not shown. Examples of the machines controlled using the PLCs 100 and 200 include actuators and robots. The PLCs 100 and 200 are connected to each other and communicate with each other via a network 400. The network 400 may be a factory automation (FA) network, represented by a field network, or another network.

The PLC 100 is equipped with a communication device 10 connected to the network 400, and multiple communication devices 30 connected to the communication device 10 via a system bus 401. The communication device 10 corresponds to a network unit or communication unit constituting the PLC 100, and each of the communication devices 30 corresponds to a central processing unit (CPU), input/output (I/O) unit, analog/digital (A/D) conversion unit, or another unit, for example. The communication device 10 may also be another unit. For example, the communication device 10 may be a CPU having a function of connection to the network 400. The cooperation of the communication devices 10 and 30 can achieve the control processes in the PLC 100.

The PLC 200 is equipped with a communication device 20 connected to the network 400, and multiple communication devices 30 connected to the communication device 20 via a system bus 402. The communication device 20 may correspond to a network unit or communication unit constituting the PLC 200 or may correspond to a CPU having a function of connection to the network 400. The cooperation of the communication devices 20 and 30 can achieve the control processes in the PLC 200.

Figure 2:
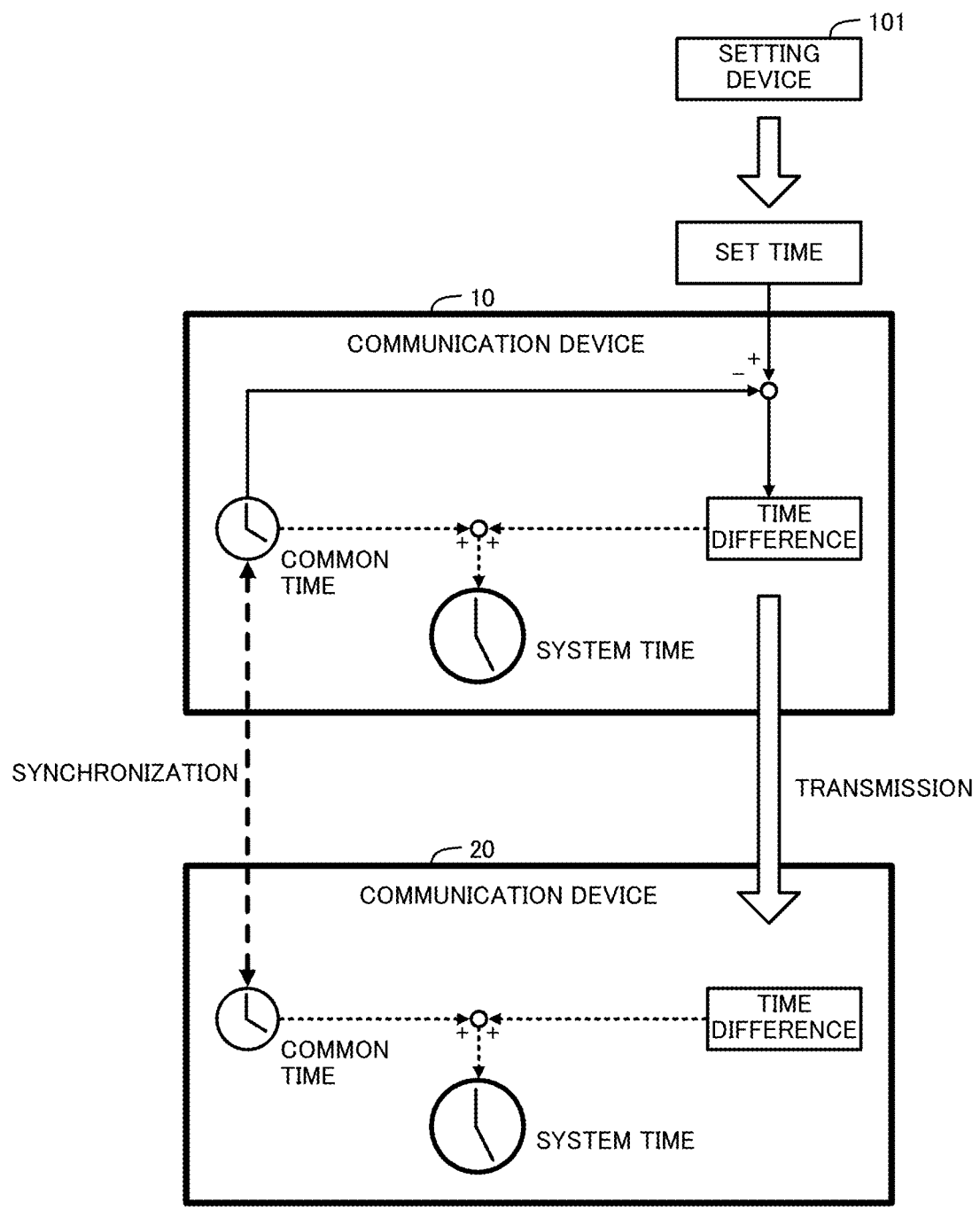
FIG. 2 is a diagram for explaining time synchronization via a network according to the embodiment.

The times of the communication devices 10 and 20 are synchronized via the network 400, as illustrated in FIG. 2. In detail, the communication device 10 shares the time with the communication device 20 in accordance with a time synchronization protocol. The time synchronization protocol is aimed at highly accurate time synchronization between machines on a communication network. A typical example of such protocol is IEEE802.1AS, which can achieve highly accurate synchronization of the times of machines on a local area network (LAN) on the order of nanoseconds. This time synchronization protocol is hereinafter referred to simply as "time synchronization protocol". The time synchronization protocol causes a grand master to transmit highly accurate reference clock signals via a network and causes a slave to receive the reference clock signals at regular intervals. The machines on the network are thus capable of highly accurate time synchronization.

In detail, data is transmitted and received between the grandmaster and the slave to measure a communication delay. The slave acquires reference clock signals after correction of this communication delay. The grand master repetitively transmits reference clock signals in a cycle time as short as several tens of microseconds. The grand master and the slave thus share the time after correction of the communication delay. In the time synchronization protocol, in the case where the time managed by the grand master has a deviation, represented by a frequency deviation described below, from the time managed by the slave, then this deviation is corrected using reference clock signals. As explained above, a synchronization error including a communication delay is corrected in accordance with the time synchronization protocol, resulting in time synchronization.

The time, resulting from synchronization in accordance with the time synchronization protocol and shared between the devices, is hereinafter referred to as "common time". The common time managed by the communication device 10 is in highly accurate synchronization with the common time managed by the communication device 20 on the order of nanoseconds. In other words, an error in the common time is at most 1 millisecond, 100 nanoseconds, or 10 nanoseconds, for example.

The common time is not directly used in control processes in the communication system 1000, but system time different from the common time serves as a reference for operations of the communication system 1000. For example, a device constituting the communication system 1000 records the system time in execution of a logging process. It should be noted that the common time serves as a reference to obtain the system time. In detail, the time calculated by adding a certain time difference to the common time corresponds to the system time. The time difference may be a positive or negative value or zero.

The communication device 10 receives set time, which is a set value of the system time set in the setting device 101. The set value is a parameter containing a value indicating a certain timing in the system time and a trigger for starting the value, for example. The trigger may be acquisition of the set value by the setting device 101 or the communication device 10, another event, or a timing designated using the common time. The communication device 10 then calculates a time difference between the system time indicated by the set value and the common time, and calculates the sum of the common time and the time difference to obtain system time. The communication device 10 then transmits data indicating the calculated time difference to the communication device 20. The communication device 20 calculates the sum of the common time and the time difference indicated by the data received from the communication device 10 to obtain system time. The system times obtained by the communication devices 10 and 20 are thus in synchronization with each other with the accuracy equal to that of the common time.

Figure 3:
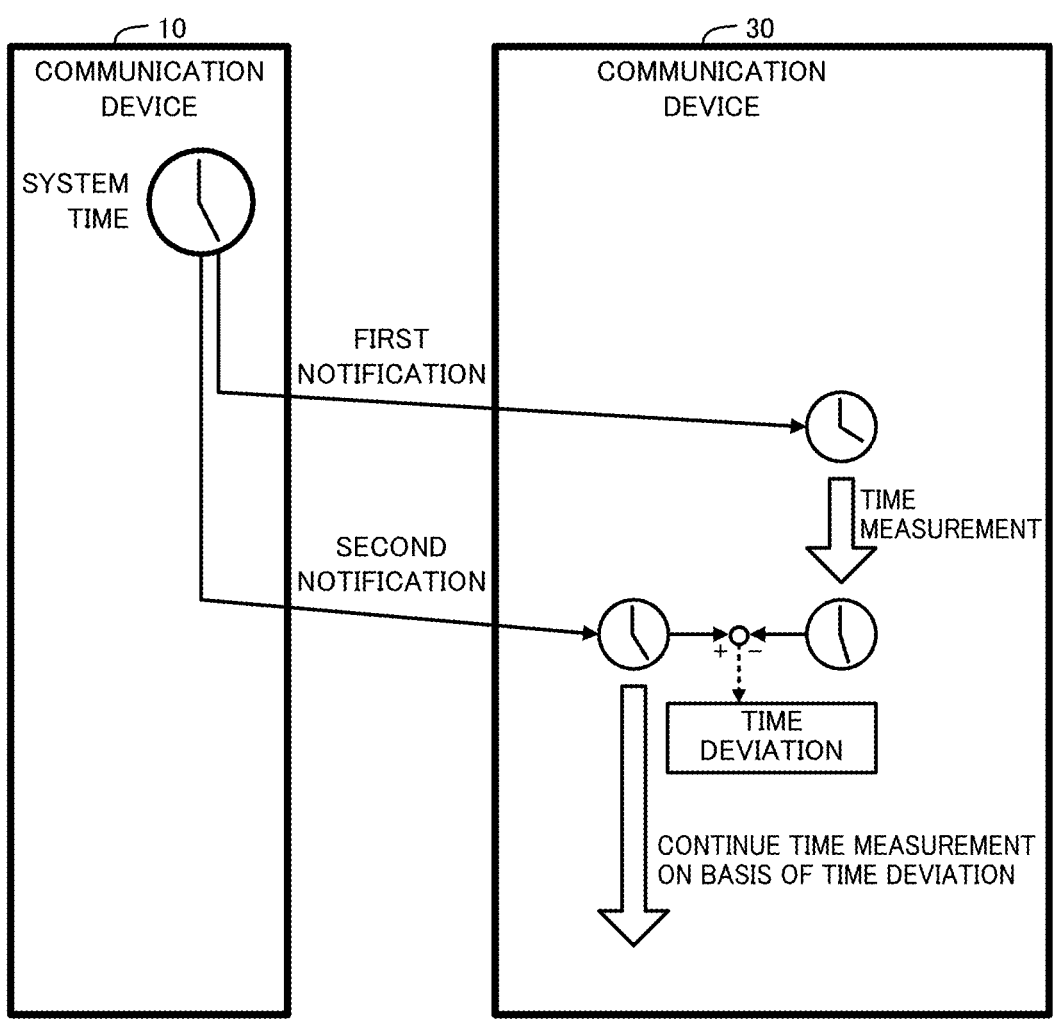
FIG. 3 is a diagram for explaining time synchronization via a system bus according to the embodiment.

The communication devices 10 and 30 share the system time via the system bus 401, as illustrated in FIG. 3. In detail, the communication device 10 repetitively notifies each of the communication devices 30 of the current value of the system time. This notification is periodically performed in a period of 1 millisecond, 100 milliseconds, or 1 minute, for example. When being notified of the system time through a first notification, the communication device 30 starts measuring system time using an internal clock element. Then, when being notified of new system time through a second notification, the communication device 30 compares the system time under measurement with the new system time, thereby calculating the difference therebetween to obtain a time deviation. The communication device 30 continues time measurement while correcting the system time on the basis of the calculated time deviation. In more detail, the communication device 30 adjusts the rate of time measurement, and thereby reduces the time deviation between the system time to be provided through a future notification after the second notification and the system time under continuous measurement. The system time subject to the adjustment of the rate of time measurement in the communication device 30 and the system time provided from the communication device 10 thus have a reduced time deviation from each other and are in synchronization with each other.

Figure 4:
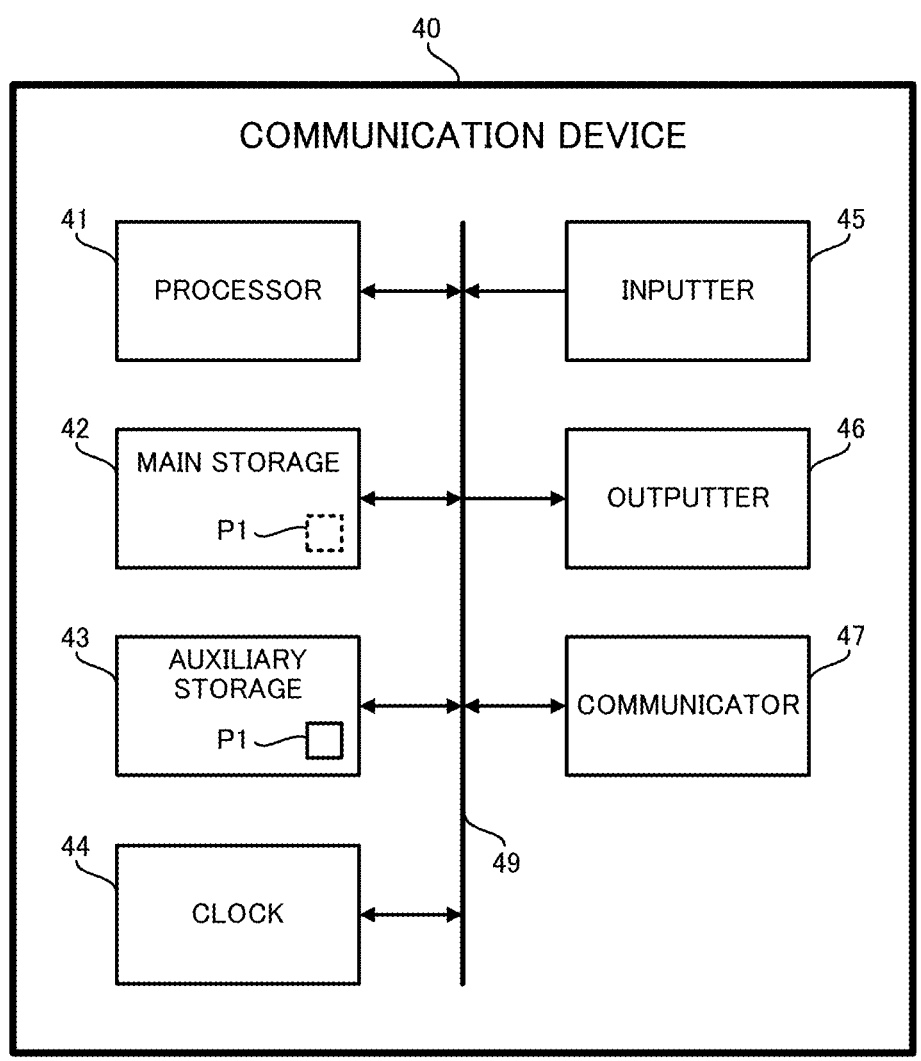
FIG. 4 illustrates a hardware configuration of a communication device according to the embodiment.

Hardware configurations of the communication devices 10, 20, and 30 are described with reference to FIG. 4. The communication devices 10, 20, and 30 are collectively called a communication device 40, as illustrated in FIG. 4. The communication device 40 has a hardware configuration including a processor 41, a main storage 42, an auxiliary storage 43, a clock 44, an inputter 45, an outputter 46, and a communicator 47. The main storage 42, the auxiliary storage 43, the clock 44, the inputter 45, the outputter 46, and the communicator 47 are each connected to the processor 41 via internal buses 49.

The processor 41 includes a central processing unit (CPU). The processor 41 executes the program P1 stored in the auxiliary storage 43 and thereby performs various functions of the communication device 40 to execute the processes explained below.

The main storage 42 includes a random access memory (RAM). The program P1 is loaded from the auxiliary storage 43 into the main storage 42. The main storage 42 serves as a work area of the processor 41.

The auxiliary storage 43 includes a non-volatile memory, represented by an electrically erasable programmable read-only memory (EEPROM) or a hard disk drive (HDD). The auxiliary storage 43 stores the program P1 and various types of data used in processes in the processor 41. The auxiliary storage 43 provides the processor 41 with the data to be used by the processor 41 and stores data fed from the processor 41 under the instructions from the processor 41.

The clock 44 includes a clock generation circuit having a crystal oscillator. The clock 44 generates a clock signal on the basis of the number of oscillations of the crystal oscillator and outputs the generated clock signal. The clock signal contains clock pulses, and used for time measurement such that the processor 41 counts the number of peaks of the clock pulses, for example.

The inputter 45 includes an input device, represented by an input key or pointing device. The inputter 45 acquires information input by a user of the communication device 40 and provides the acquired information to the processor 41.

The outputter 46 includes an output device, represented by a liquid crystal display (LCD) or speaker. The outputter 46 presents various types of information to the user under the instructions from the processor 41.

The communicator 47 includes a network interface circuit to communicate with external apparatuses. The communicator 47 receives signals from the outside and outputs data indicated by the signals to the processor 41. The communicator 47 also transmits signals indicating the data output from the processor 41 to external apparatuses. Although FIG. 4 illustrates a single communicator 47 as a representative example, the communication device 10 may separately include a communicator 47 for connection to the transmission line 102, a communicator 47 for connection to the network 400, and a communicator 47 for connection to the system bus 401. Also, the communication device 20 may separately include a communicator 47 for connection to the network 400 and a communicator 47 for connection to the system bus 402.

Figure 5:
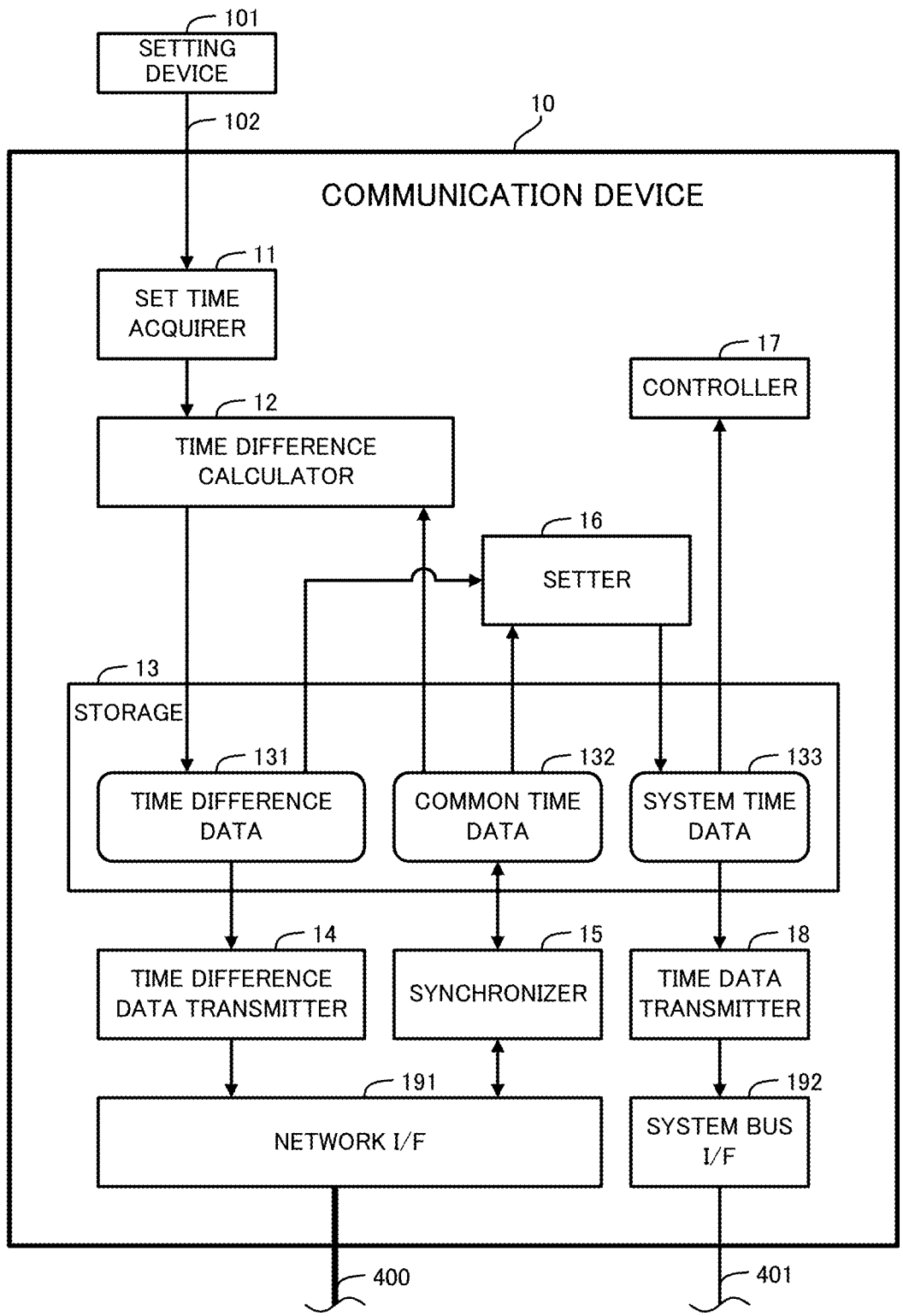
FIG. 5 is a first diagram illustrating a functional configuration of a communication device according to the embodiment.

The cooperation of the hardware components illustrated in FIG. 4 enables the communication device 40 to perform various functions. In detail, as illustrated in FIG. 5, the communication device 10 has a functional configuration including a set time acquirer 11 to acquire set time from the setting device 101 via the transmission line 102, a time difference calculator 12 to calculate the time difference between the set time and the common time, a storage 13 to store various types of data, a time difference data transmitter 14 to transmit time difference data 131 indicating the time difference via a network interface (I/F) 191 to the network 400, a synchronizer 15 for synchronization of the common time with the communication device 20 via the network 400, a setter 16 to set the sum of the common time and the time difference as the system time and measure the system time, a controller 17 to execute control processes using the system time, a time data transmitter 18 to transmit system time data 133 indicating the system time via a system bus I/F 192 to the system bus 401, the network I/F 191 for communication via the network 400, and the system bus I/F 192 for communication via the system bus 401.

The set time acquirer 11 is mainly achieved by cooperation of the processor 41 and the communicator 47 of the communication device 10. The set time acquirer 11 is an example of acquisition means for acquiring set time set by the user, in the communication device 10. The set time acquirer 11 acquires setting information indicating the set time from the setting device 101 via the transmission line 102. This setting information associates a set value of the system time with a trigger indicating the timing of application of the set value, for example, as illustrated in FIG. 6. The trigger in the example illustrated in FIG. 6 indicates immediate application of the set value to the current time. It should be noted that the trigger may be excluded from the information acquired by the set time acquirer 11. In the case of exclusion of the trigger, the timing of application of the set time is preliminarily defined. A typical example of the preliminarily defined timing is the current time, that is, immediate time. Referring back to FIG. 5, the set time acquirer 11 transmits the acquired information indicating the set time to the time difference calculator 12.

The time difference calculator 12 is mainly achieved by the processor 41 of the communication device 10. The time difference calculator 12 acquires the information indicating the set time transmitted from the set time acquirer 11, reads common time data 132 indicating the common time from the storage 13, and calculates the time difference between the set time and the common time at the timing of application of the set time. In other words, the time difference calculator 12 calculates the time difference by subtracting the common time from the set time. In the case where the information illustrated in FIG. 6 is acquired by the set time acquirer 11, the time difference calculator 12 instantly reads the common time from the storage 13 and subtracts the common time from the set time. In this case, when the read common time is "Dec. 25, 2018, 15:40 and 45.678 seconds", for example, then the time difference calculator 12 subtracts the read common time from the time of "Dec. 25, 2018, 15:40 and 50.789 seconds" in FIG. 6 and thereby obtains the time difference of "5.111 seconds", that is, 5,111 milliseconds. The time difference calculator 12 then stores the time difference data 131 indicating the calculated time difference into the storage 13. The calculation of the time difference and the storage of the time difference data should be performed at the timing of application of the set value in the case where this timing is different from the current timing. Alternatively, the time difference may be obtained by calculating the common time at this timing in the case where the timing can be determined through calculation.

The storage 13 is mainly achieved by at least one of the register included in the processor 41, the main storage 42, and the auxiliary storage 43 of the communication device 10. The storage 13 stores the time difference data 131, the common time data 132 indicating the current value of the common time, and the system time data 133 indicating the current value of the system time. The common time data 132 is updated by the synchronizer 15, while the system time data 133 is updated by the setter 16.

The time difference data transmitter 14 is mainly achieved by the processor 41 of the communication device 10. The time difference data transmitter 14 is an example of time-difference-data transmission means for transmitting the time difference data 131 indicating the time difference between the common time and the set time to the communication device 20, in the communication device 10. When the time difference data 131 is stored into the storage 13, the time difference data transmitter 14 reads the time difference data 131 from the storage 13 and transmits the time difference data 131 via the network I/F 191 and the network 400 to the communication device 20.

The synchronizer 15 is mainly achieved by cooperation of the processor 41 and the clock 44 of the communication device 10. The synchronizer 15 performs synchronization of the common time with the communication device 20 via the network I/F 191 and the network 400. Although the synchronization at the synchronizer 15 is performed in accordance with the time synchronization protocol, this configuration is a mere example. The synchronization may also be performed in accordance with another time synchronization protocol. The communication device 10 including the synchronizer 15 that operates in accordance with the time synchronization protocol may correspond to a grand master or slave. The synchronizer 15 then updates the common time data 132 stored in the storage 13 to data indicating the current value.

The setter 16 is mainly achieved by cooperation of the processor 41 and the clock 44 of the communication device 10. The setter 16 is an example of first setting means for setting the set time as the system time of the communication device 10. The setter 16 reads the common time data 132 and the time difference data 131 from the storage 13, calculates the sum of the common time indicated by the common time data 132 and the time difference indicated by the time difference data 131, and thereby sets the calculated time as the system time. In detail, the setter 16 reads and adds the common time and the time difference at regular intervals and updates the system time data 133 stored in the storage 13 to data indicating the value resulting from the addition. It should be noted that the period of executing the addition for obtaining the system time is determined in view of the calculation load accompanied by the addition. This period is 10 milliseconds or 1 second, for example. Within this period, the setter 16 updates the system time data 133 on the basis of the number of clock pulses counted at the clock 44.

The controller 17 is mainly achieved by the processor 41 of the communication device 10. The controller 17 reads the system time data 133 from the storage 13 and executes various processes using the system time. For example, the controller 17 may execute a logging process of successively storing records indicating types of events associated with system times, or may wait until the system time reaches a predetermined value and then execute a scheduled process.

The time data transmitter 18 is mainly achieved by the processor 41 of the communication device 10. The time data transmitter 18 is an example of time data transmission means for repetitively transmitting time data indicating the system time via the system bus 401 to the communication devices 30. The time data transmitter 18 monitors the system time data 133 stored in the storage 13, and transmits the system time data 133 indicating the current value of the system time via the system bus I/F 192 and the system bus 401 to the communication devices 30 at regular intervals based on the time indicated by the system time data 133. The period of transmission may be equal to or different from the period of the addition at the setter 16.

The network I/F 191 and the system bus I/F 192 are mainly achieved by the communicator 47 of the communication device 10.

Figure 7:
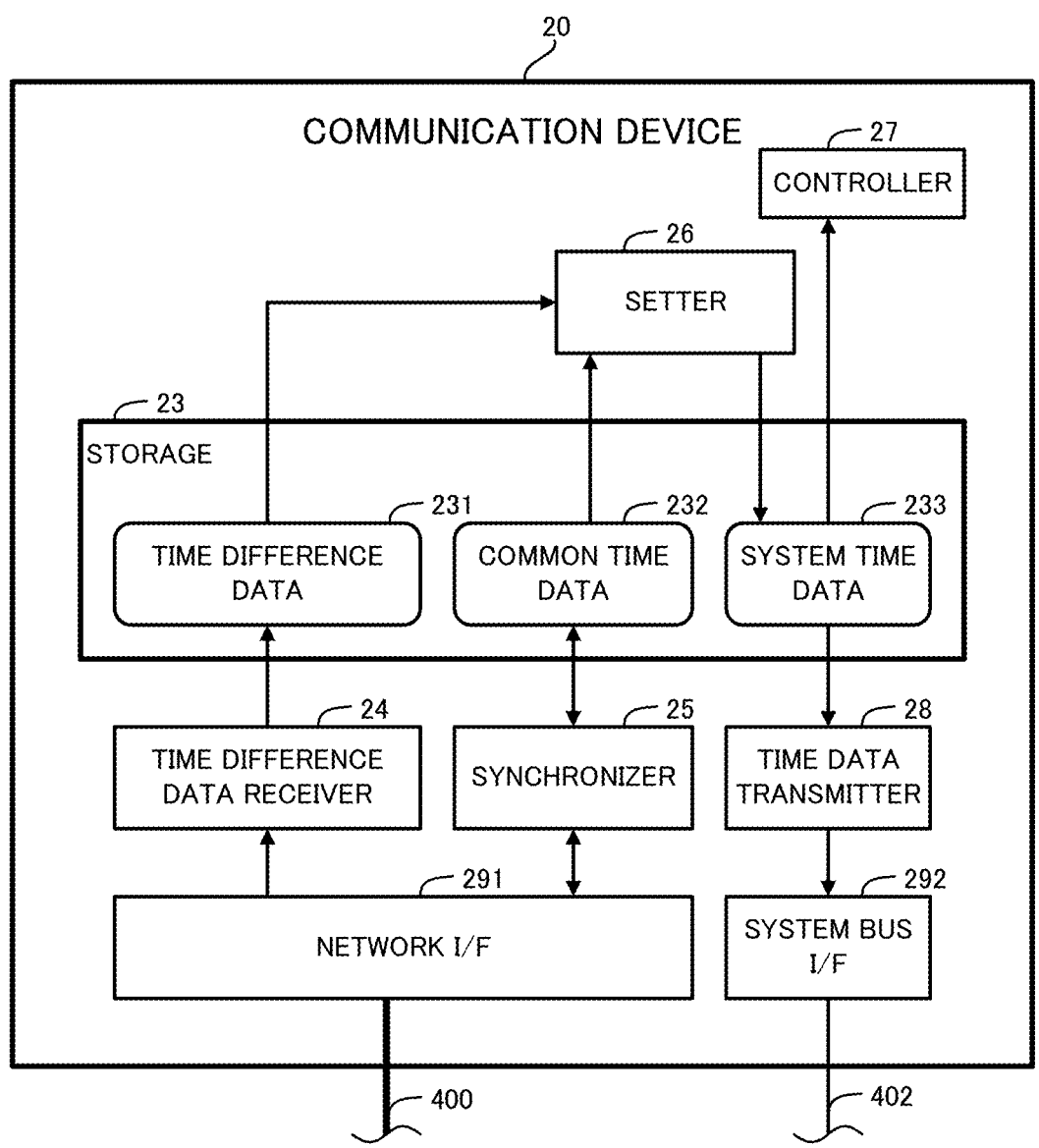
FIG. 7 is a second diagram illustrating a functional configuration of a communication device according to the embodiment.

A functional configuration of the communication device 20 is described with reference to FIG. 7. The communication device 20 has functions identical to some functions of the communication device 10 but differs from the communication device 10 in having a component for acquiring the time difference from the communication device 10. In detail, as illustrated in FIG. 7, the communication device 20 includes a storage 23 to store various types of data, a time difference data receiver 24 to receive the time difference data 131 from the communication device 10, a synchronizer 25 for synchronization of the common time with the communication device 10 via the network 400, a setter 26 to set the sum of the common time and the time difference as the system time, a controller 27 to execute control processes using the system time, a time data transmitter 28 to transmit system time data 233 indicating the system time via a system bus I/F 292 to the system bus 402, a network I/F 291 for communication via the network 400, and the system bus I/F 292 for communication via the system bus 402.

The storage 23 is mainly achieved by at least one of the register included in the processor 41, the main storage 42, and the auxiliary storage 43 of the communication device 20. The storage 23 stores time difference data 231, common time data 232 indicating the current value of the common time, and the system time data 233 indicating the current value of the system time. The common time data 232 is updated by the synchronizer 25, while the system time data 233 is updated by the setter 26.

The time difference data receiver 24 is mainly achieved by the processor 41 of the communication device 20. The time difference data receiver 24 is an example of time-difference-data reception means for receiving the time difference data 131 transmitted from the communication device 10, in the communication device 20. When receiving the time difference data 131 from the communication device 10 via the network 400 and the network I/F 291, the time difference data receiver 24 stores this time difference data 131 into the storage 23 in the form of the time difference data 231.

The synchronizer 25 is mainly achieved by cooperation of the processor 41 and the clock 44 of the communication device 20. The synchronizer 25 performs synchronization of the common time with the communication device 10 by means of communication with the communication device 10 in accordance with the time synchronization protocol. The communication device 20 including the synchronizer 25 may correspond to a grand master or slave. Alternatively, both of the communication devices 10 and 20 may correspond to slaves. The synchronizer 25 then updates the common time data 232 stored in the storage 23 to data indicating the current value.

The setter 26 is mainly achieved by cooperation of the processor 41 and the clock 44 of the communication device 20. The setter 26 is an example of second setting means for setting the sum of the common time and the time difference indicated by the time difference data 131 received by the time difference data receiver 24 as the system time of the communication device 20, in the communication device 20. The setter 26 reads the common time data 232 and the time difference data 231 from the storage 23, calculates the sum of the common time indicated by the common time data 232 and the time difference indicated by the time difference data 231, and thereby sets the calculated time as the system time, like the setter 16 of the communication device 10. Once the setter 26 acquires the time difference data 231, the setter 26 monitors the common time data 232 and updates the system time data 233 stored in the storage 23 to data indicating the sum of the current value of the common time and the time difference.

The controller 27 is mainly achieved by the processor 41 of the communication device 20. The controller 27 reads the system time data 233 from the storage 23 and executes various processes using the system time.

The time data transmitter 28 is mainly achieved by the processor 41 of the communication device 20. The time data transmitter 28 is an example of the time data transmission means for repetitively transmitting time data indicating the system time via the system bus 402 to the communication devices 30. The time data transmitter 28 monitors the system time data 233 stored in the storage 23, and transmits the system time data 233 indicating the current value of the system time via the system bus I/F 292 and the system bus 402 to the communication devices 30 at regular intervals based on the time indicated by the system time data 233, like the time data transmitter 18 of the communication device 10.

The network I/F 291 and the system bus I/F 292 are mainly achieved by the communicator 47 of the communication device 20.

Figure 8:
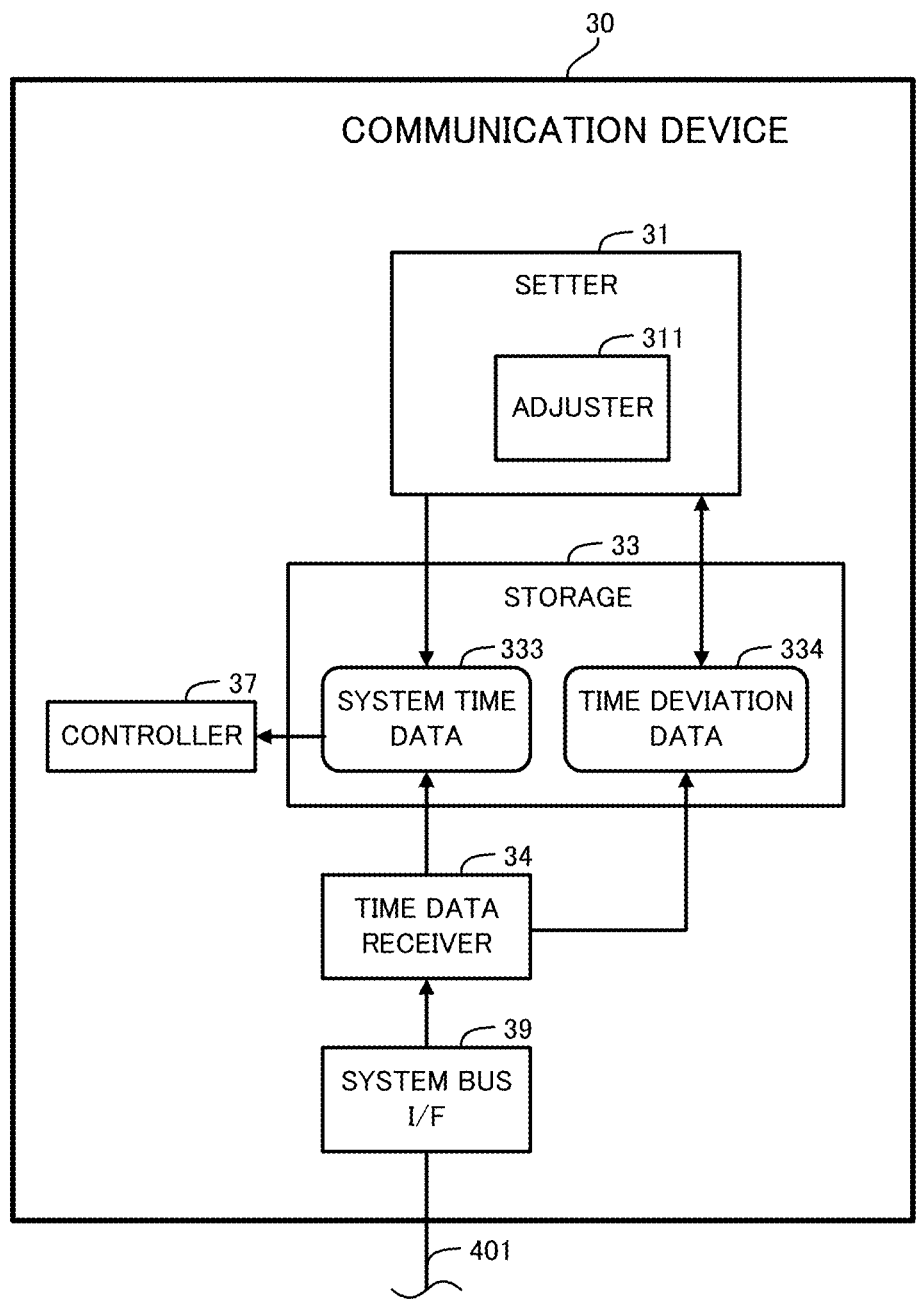
FIG. 8 is a third diagram illustrating a functional configuration of a communication device according to the embodiment.

A functional configuration of the communication devices 30 is described with reference to FIG. 8. Each of the communication devices 30 that constitute the PLC 100 together with the communication device 10 has the configuration identical to that of each of the communication devices 30 that constitute the PLC 200 together with the communication device 20. The following description is directed to the configuration of the communication device 30 constituting the PLC 100 as an example.

The communication device 30 has no component for synchronization of the common time or no component for obtaining the system time on the basis of the time difference. The communication device 30 measures the system time using an internal clock element, on the basis of the system time provided from the communication device 10 at regular intervals. With reference to FIG. 8, the communication device 30 includes a setter 31 to set to the system time, a storage 33 to store various types of data, a time data receiver 34 to receive the system time data 133 from the communication device 10, a controller 37 to execute control processes using the system time, and a system bus I/F 39 for communication via the system bus 401.

The setter 31 is mainly achieved by cooperation of the processor 41 and the clock 44 of the communication device 30. The setter 31 is an example of third setting means for setting the system time indicated by the system time data 133 received by the time data receiver 34 as the system time managed by the communication device 30 itself, in the communication device 30. When system time data 333 stored in the storage 33 is updated by the time data receiver 34, the setter 31 measures the system time by counting the number of clock pulses of the clock signal, and updates the system time data 333 to data indicating the current time based on the counted number.

The setter 31 is able to accurately measure the system time provided that the clock 44 of the communication device 30 generates an accurate clock signal. Unfortunately, the crystal oscillator of the communication device 30 may have a frequency deviation from crystal oscillators of other devices, because of slight differences in the oscillation frequencies of the crystal oscillators. Accordingly, when a new notification of the current value of the system time is provided from the communication device 10 after the start of measurement of the system time based on the number of clock pulses counted at the setter 31, the system time under measurement at the setter 31 may have a time deviation from the provided system time.

In order to reduce such a time deviation, the setter 31 corrects the system time under measurement on the basis of the received time data. In detail, the setter 31 includes an adjuster 311 to adjust the rate of time measurement at the setter 31 for a reduction in the time deviation. The adjuster 311 compares the value of the system time under measurement at the setter 31 with the current value of the system time provided from the communication device 10. In more detail, the adjuster 311 subtracts the provided current value of the system time from the measured value of the system time and thereby obtains a time deviation. The adjuster 311 stores time deviation data 334 indicating this time deviation into the storage 33. The adjuster 311 then adjusts the rate of time measurement on the basis of the time deviation data 334 such that the time deviation is as small as possible at the time of a subsequent notification of the system time.

The storage 33 is mainly achieved by at least one of the register included in the processor 41, the main storage 42, and the auxiliary storage 43 of the communication device 30. The storage 33 stores the system time data 333 indicating the current value of the system time and the time deviation data 334 indicating the time deviation. The system time data 333 is updated by the setter 31, while the time deviation data 334 is updated by the time data receiver 34 and used by the adjuster 311.

The time data receiver 34 is mainly achieved by the processor 41 of the communication device 30. The time data receiver 34 is an example of time data reception means for receiving the system time data 133 from the communication device 10, in the communication device 30. The time data receiver 34 stores the system time data 133, which is received from the communication device 10 via the system bus 401 and the system bus I/F 39, into the storage 33 in the form of the system time data 333.

The controller 37 is mainly achieved by the processor 41 of the communication device 30. The controller 37 reads the system time data 233 from the storage 33 and executes various processes using the system time. The system bus I/F 39 is mainly achieved by the communicator 47 of the communication device 30.

A first process executed in the communication device 10, a second process executed in the communication device 20, and a third process executed in the communication device 30 are explained in order.

Figure 9:
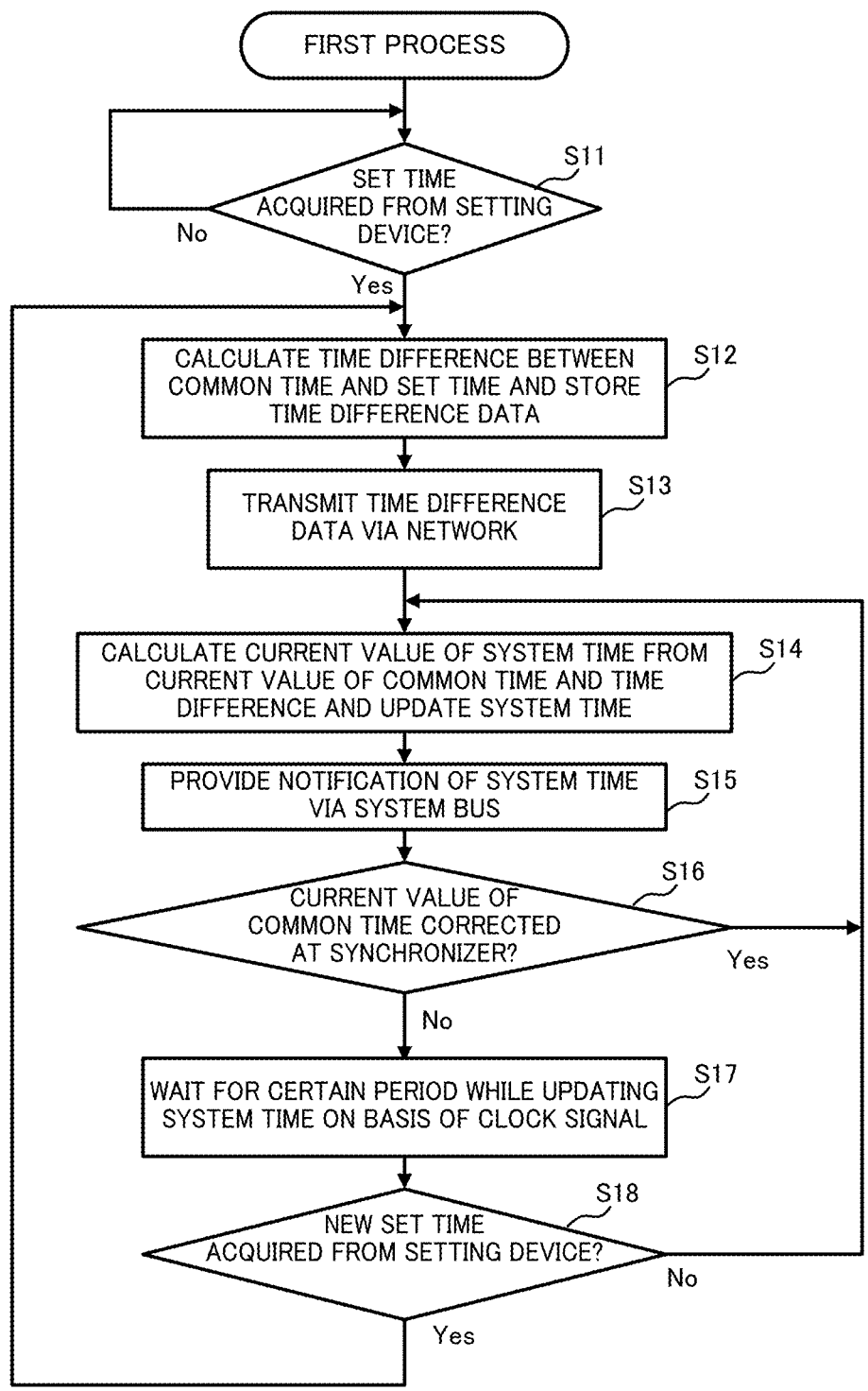
FIG. 9 is a flowchart of a first process according to the embodiment.

The first process illustrated in FIG. 9 is started in response to activation of the communication device 10. It should be noted that the first process is executed in parallel to the process of synchronizing the common time at the synchronizer 15. In the first process, the communication device 10 determines whether set time has been acquired from the setting device 101 (Step S11). Specifically, the set time acquirer 11 determines whether a set value of the system time has been acquired from the setting device 101.

When a determination is made that no set time has been acquired (Step S11; No), the communication device 10 repeats the determination in Step S11 and waits until acquisition of set time. In contrast, when a determination is made that set time has been acquired (Step S11; Yes), the communication device 10 calculates the time difference between the common time and the set time, and stores the time difference data 131 (Step S12). Specifically, the time difference calculator 12 subtracts the common time from the system time indicated by the set time, of which acquisition is determined in Step S11, and stores the time difference data 131 indicating the time difference resulting from this subtraction into the storage 13.

Figure 10:
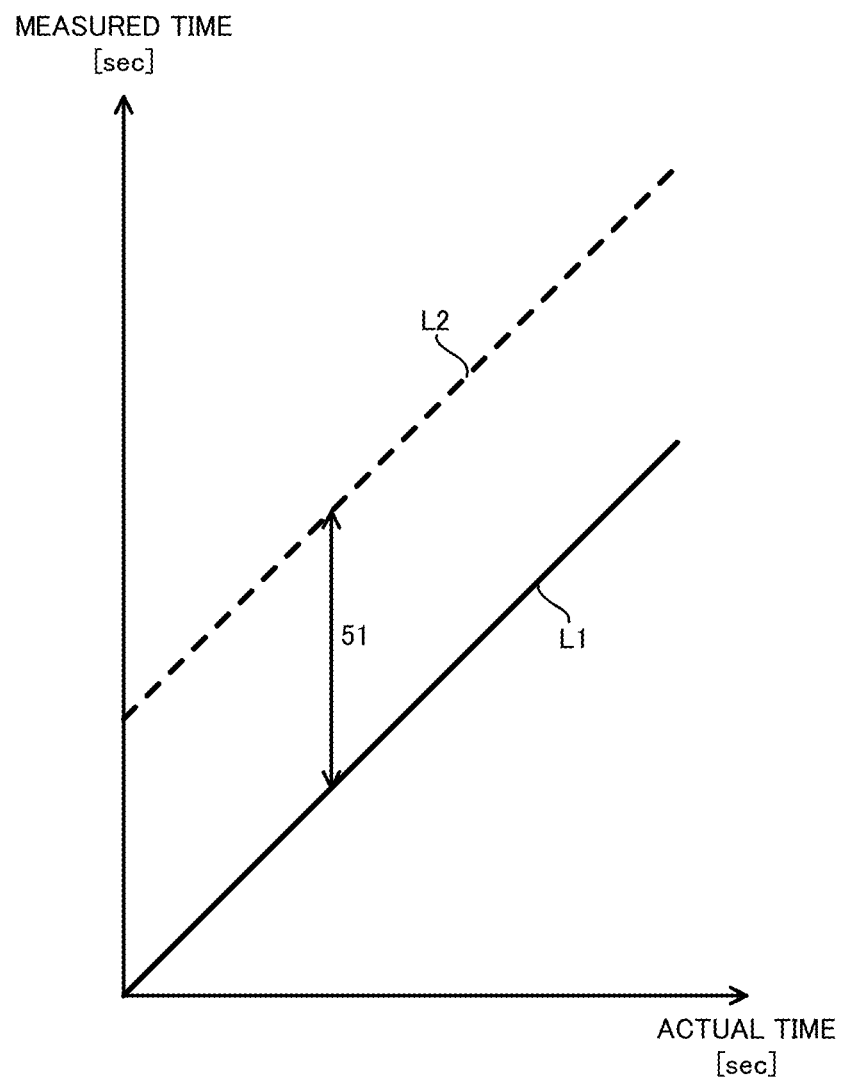
FIG. 10 illustrates the relationship between common time and system time according to the embodiment.

FIG. 10 illustrates the relationship between common time and system time. In FIG. 10, the horizontal axis corresponds to the actual time, which is time that has actually elapsed, and the vertical axis corresponds to measured time as the common time and the system time. The solid line L1 shows the progression of the common time, and the dashed line L2 shows the progression of the system time. As illustrated in FIG. 10, the time difference 51 between the system time and the common time is always constant.

Referring back to FIG. 9, after Step S12, the communication device 10 transmits the time difference data 131 via the network 400 (Step S13). Specifically, the time difference data transmitter 14 transmits the time difference data 131 indicating the time difference calculated in Step S12 to the communication device 20.

The communication device 10 then calculates the current value of the system time from the current value of the common time and the time difference and updates the system time (Step S14). Specifically, the setter 16 obtains the latest value of the system time by calculating the sum of the common time and the time difference calculated in Step S12, and updates the system time data 133 stored in the storage 13 to the latest value resulting from the calculation.

The communication device 10 then provides a notification of the system time via the system bus 401 (Step S15). Specifically, the time data transmitter 18 transmits the system time data 133 indicating system time, which is updated in Step S14, to the communication devices 30.

The communication device 10 then determines whether the current value of the common time has been corrected at the synchronizer 15 (Step S16). Specifically, the synchronizer 15 determines whether the common time data 132 has been updated by means of transmission of reference clock signals from the grand master.

When a determination is made that the current value of the common time has been corrected at the synchronizer 15 (Step S16; Yes), the communication device 10 repeats Step S14 and the following steps. These steps cause the system time to be updated on the basis of the corrected common time at the timing immediately after correction of the common time. In contrast, when a determination is made that the current value of the common time has not been corrected at the synchronizer 15 (Step S16; No), the communication device 10 waits for a certain period while updating the system time on the basis of the clock signal (Step S17). Specifically, the setter 16 updates the system time using the clock 44.

The communication device 10 then determines whether new set time has been acquired from the setting device 101 (Step S18). Specifically, the set time acquirer 11 determines whether a new set value of the system time has been transmitted from the setting device 101.

When a determination is made that no new set time has been acquired from the setting device 101 (Step S18; No), the communication device 10 repeats Step S14 and the following steps. These steps cause the calculation of the system time in Step S14 and the notification of the system time in Step S15 to be repeated in the period equal to the certain waiting period in Step S17.

The update of the system time in Step S17 is performed on the basis of the counted number of clock pulses. The oscillation frequency of the crystal oscillator for generating these clock pulses, however, may have a frequency deviation, as explained above. That is, the system time updated in Step S17 does not necessarily have the constant time difference 51 from the common time as illustrated in FIG. 10, but may be measured at a rate indicated by the lines L3 or L4 in FIG. 11, different from the line L1 representing the common time. In order to solve this problem, the update of the system time in step S14 is performed at regular intervals at the timings T1, T2, and T3 illustrated in FIG. 11, for example. The time difference between the system time and the common time is thus corrected at these timings and prevented from being significantly deviated from the initial difference. The process can therefore maintain the high accuracy of the system time to some extent.

Referring back to FIG. 9, when a determination is made that new set time has been acquired from the setting device 101 in Step S18 (Step S18; Yes), the communication device 10 repeats Step S12 and the following steps. The system time is thus updated again using the time difference based on the new set value.

Figure 12:
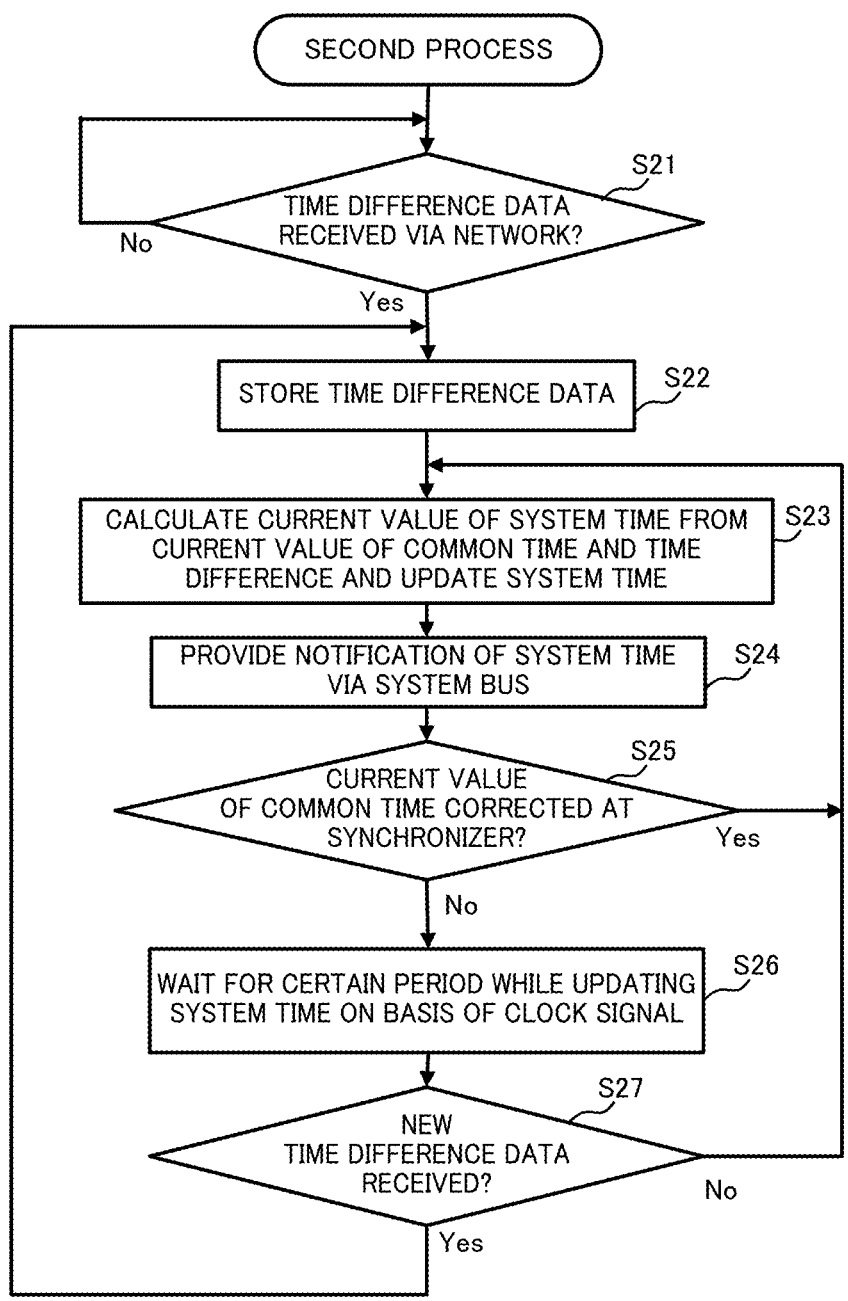
FIG. 12 is a flowchart of a second process according to the embodiment.

The second process executed in the communication device 20 is explained with reference to FIG. 12. The second process illustrated in FIG. 12 is started in response to activation of the communication device 20. It should be noted that the second process is executed in parallel to the process of synchronizing the common time at the synchronizer 25. In the second process, the communication device 20 determines whether the communication device 20 has received the time difference data 131 via the network 400 (Step S21). Specifically, the time difference data receiver 24 determines whether the time difference data 131 transmitted from the communication device 10 has been received via the network 400.

When a determination is made that no time difference data 131 has been received (Step S21; No), the communication device 20 repeats the determination in Step S21 until receiving the time difference data 131. In contrast, when a determination is made that the time difference data 131 has been received (Step S21; Yes), the communication device 20 stores the time difference data 131 (Step S22). Specifically, the time difference data receiver 24 stores the time difference data 131, of which acquisition is determined in Step S21, into the storage 13 in the form of the time difference data 231.

The communication device 20 then calculates the current value of the system time from the current value of the common time and the time difference and updates the system time (Step S23). Specifically, the setter 26 obtains the latest value of the system time by calculating the sum of the common time and the time difference stored in Step S22, and updates the system time data 233 stored in the storage 23 to the latest value resulting from the calculation.

The communication device 20 then provides a notification of the system time via the system bus 402 (Step S24). Specifically, the time data transmitter 28 transmits the system time data 233 indicating the system time, which is updated in Step S23, to the communication devices 30.

The communication device 20 then determines whether the current value of the common time has been corrected at the synchronizer 25 (Step S25). Specifically, the synchronizer 25 determines whether the common time data 132 has been updated by means of transmission of reference clock signals from the grand master.

When a determination is made that the current value of the common time has been corrected at the synchronizer 25 (Step S25; Yes), the communication device 20 repeats Step S23 and the following steps. In contrast, when a determination is made that the current value of the common time has not been corrected at the synchronizer 25 (Step S25; No), the communication device 20 waits for a certain period while updating the system time on the basis of the clock signal (Step S26). Specifically, the setter 26 updates the system time using the clock 44.

The communication device 20 then determines whether new time difference data 131 has been received from the communication device 10 (Step S27). Specifically, the time difference data receiver 24 determines whether new time difference data 131 indicating the time difference has been transmitted from the communication device 10.

Figure 11:
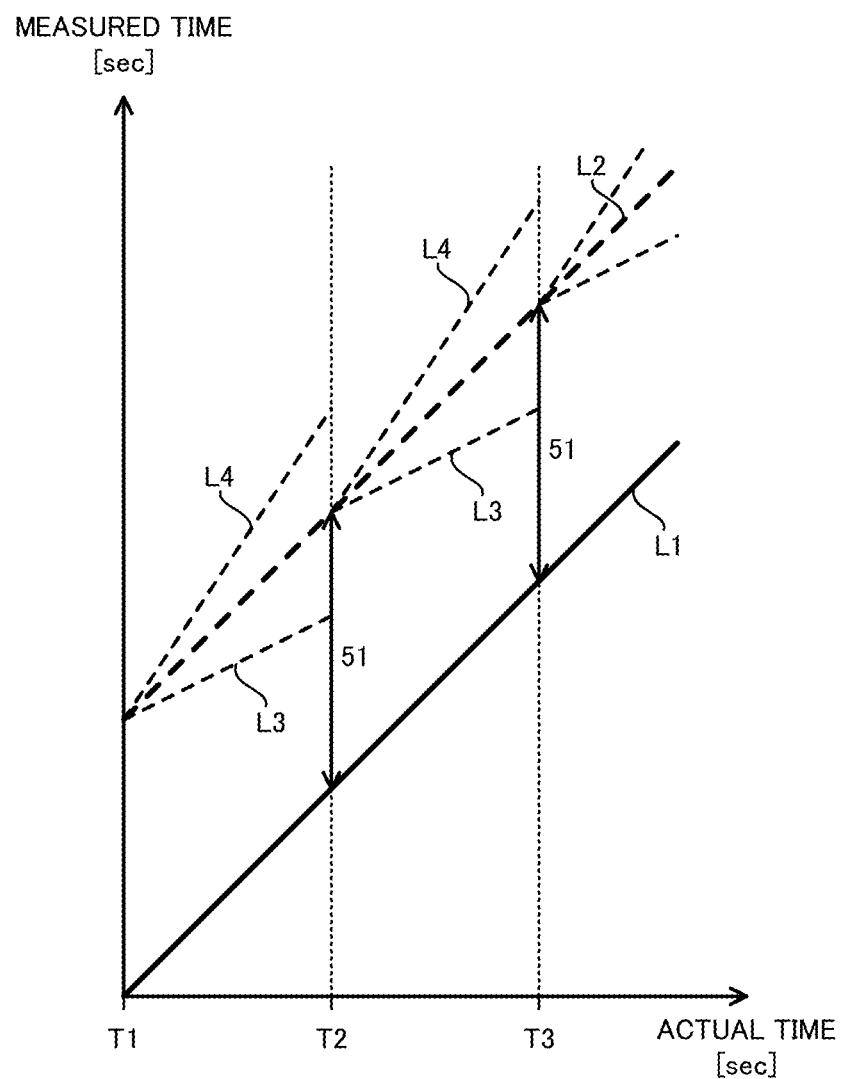
FIG. 11 is a diagram for explaining measurement of system time according to the embodiment.

When a determination is made that no new time difference data 131 has been received (Step S27; No), the communication device 20 repeats Step S23 and the following steps. These steps cause the calculation of the system time in Step S23 and the notification of the system time in Step S24 to be repeated in the period equal to the certain waiting period in Step S26. The process can thus repetitively correct the system time as illustrated in FIG. 11, and therefore maintain the high accuracy of the system time to some extent.

In contrast, when a determination is made that new time difference data 131 has been received (Step S27; Yes), the communication device 20 repeats Step S22 and the following steps. The system time is thus updated again using the new time difference.

Figure 13:
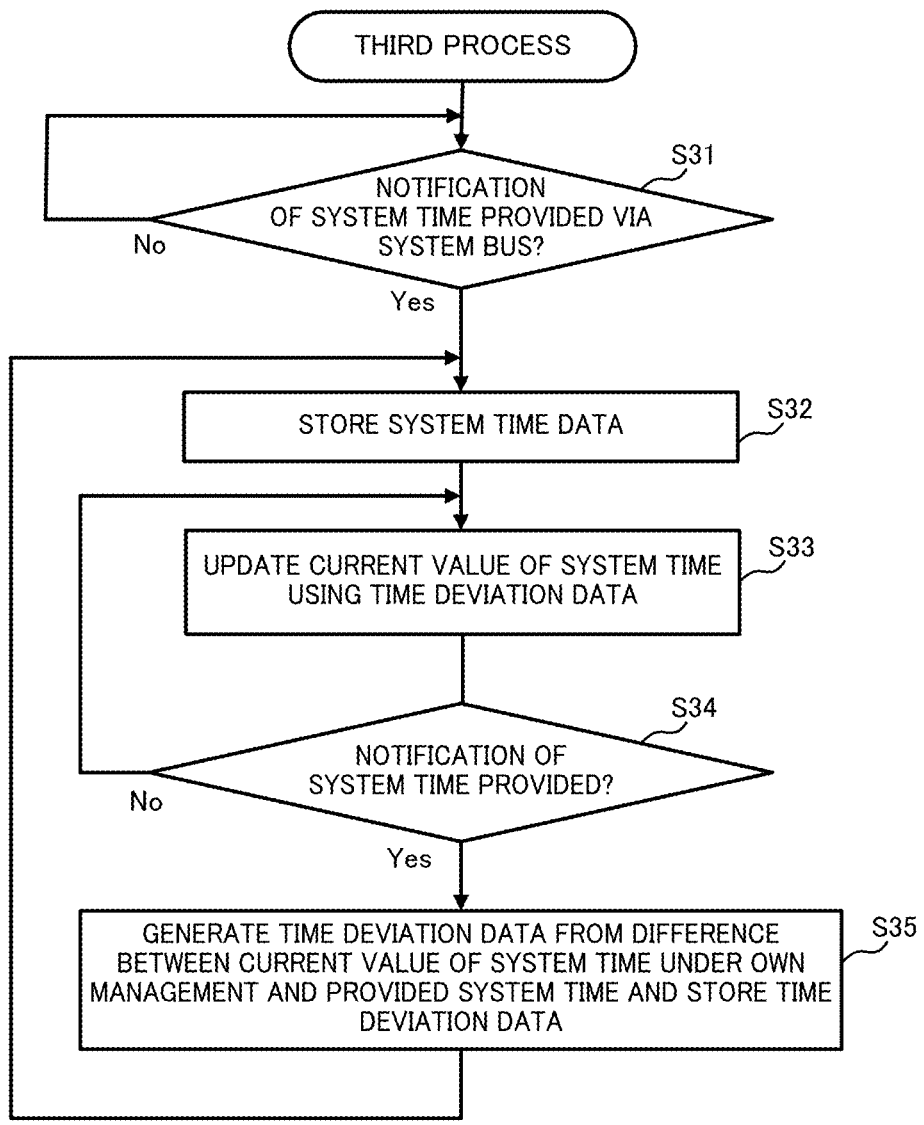
FIG. 13 is a flowchart of a third process according to the embodiment.

The third process executed in the communication devices 30 is explained with reference to FIG. 13. The third process illustrated in FIG. 13 is executed in the communication devices 30 constituting the PLC 100. The communication devices 30 constituting the PLC 200 execute the process identical to the third process. The third process is started in response to activation of each of the communication devices 30.

In the third process, the communication device 30 determines whether a notification of the system time has been provided via the system bus 401 (Step S31). Specifically, the time data receiver 34 determines whether the system time data 133 indicating the current value of the system time has been received from the communication device 10.

When a determination is made that no notification of the system time has been provided (Step S31; No), the communication device 30 repeats the determination in Step S31 and waits until notification of system time. In contrast, when a determination is made that a notification of the system time has been provided (Step S31; Yes), the communication device 30 stores the system time data 333 (Step S32). Specifically, the time data receiver 34 stores the system time data 333 indicating the system time, of which notification is determined in Step S31, into the storage 33.

The communication device 30 then updates the current value of the system time using the time deviation data 334 (Step S33). Specifically, the setter 31 counts the number of clock pulses on the basis of the time deviation data 334, and updates the system time data 333 to the data indicating the current value of the system time on the basis of the counted number. In the first execution of Step S33, the setter 31 updates the system time data 333 simply on the basis of the counted number of clock pulses because the time deviation data 334 is the initial data containing no substantial information. In this case, the adjuster 311 executes substantially no adjustment of the rate of time measurement.

The communication device 30 then determines whether a new notification of the system time has been provided (Step S34). When a determination is made that no notification of the system time has been provided (Step S34; No), the communication device 30 repeats Step S33 and the following steps. The system time data 333 is thus updated on the basis of the clock signal.

In contrast, if determining that a notification of the system time has been provided (Step S34; Yes), the communication device 30 generates time deviation data 334 from the difference between the current value of the system time managed by the communication device 30 itself and the provided system time, and stores the time deviation data 334 (Step S35). Specifically, the time data receiver 34 compares the value of the system time data 333 stored in the storage 33 with the value of the system time in the new notification, and stores the time deviation data 334 indicating the difference therebetween into the storage 33. The time deviation data 334 may be information for merely associating the time deviation with the period of notification of the system time, or information indicating the value calculated by dividing the time deviation by the notification period, or another information necessary for adjustment of the rate of time measurement at the adjuster 311.

The communication device 30 then repeats Step S32 and the following steps. In the repeated steps, the rate of counting clock pulses is adjusted at the adjuster 311 during re-execution of Step S33.

Figure 14:
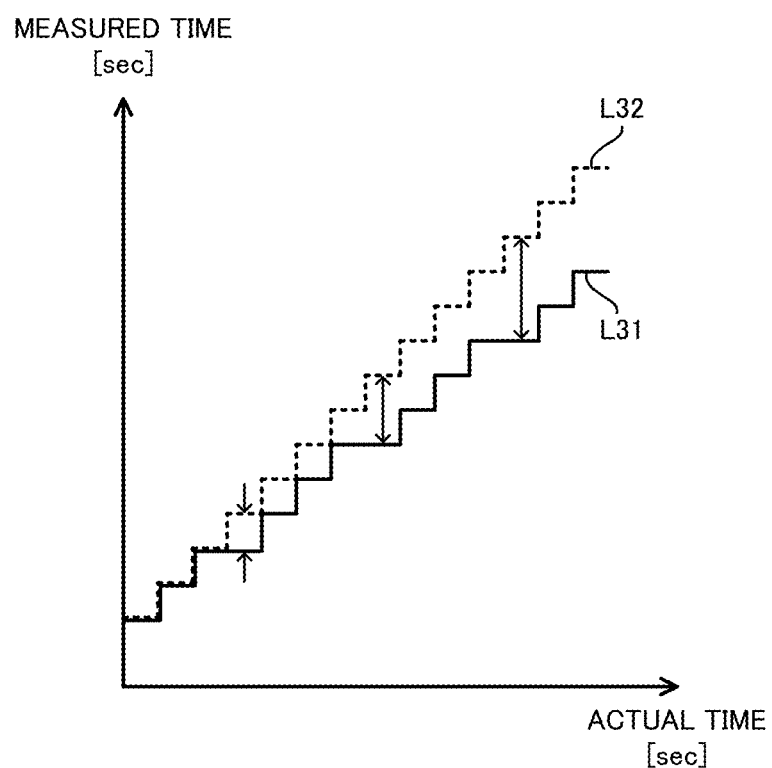
FIG. 14 is a diagram for explaining adjustment of the rate of time measurement according to the embodiment.

FIG. 14 is a schematic diagram illustrating a specific example of adjustment of the rate of time measurement at the adjuster 311. The solid line L31 in FIG. 14 indicates the system time under measurement in the communication device 10. Some sample values are extracted from the line L31 at regular intervals and provided to the communication device 30. The line L32 indicates the number of clock pulses counted at the setter 31 of the communication device 30. As is apparent from the comparison between the lines L31 and L32, the line L32 is deviated by one count from the line L31 every three counts. Accordingly, the time deviation caused by a frequency deviation increases according to the lapse of the actual time.

In order to avoid such deviation, the adjuster 311 adjusts the rate of time measurement. In the example illustrated in FIG. 14, the adjuster 311 skips counting a clock pulse after every appearance of three clock pulses. The result of counting after adjustment at the adjuster 311 is therefore to be approximately equal to the system time to be provided from the communication device 10.

As described above, the communication devices 10 and 20 perform synchronization of common time via the network 400. The communication device 10 includes the setter 16 to set the set time set by the user as system time, and the time difference data transmitter 14 to transmit the time difference data 131. The communication device 20 includes the setter 26 to set the sum of the common time and the time difference indicated by the time difference data 231 as system time. This configuration enables the user to arbitrarily set system time as required and achieves synchronization of the set system time between the communication devices 10 and 20. The configuration can thus improve the convenience of times to be synchronized for use in the system.

Although the time difference data 131 is transmitted and received between the communication devices 10 and 20, no data indicating the current time is transmitted or received, except for the data necessary for synchronization of the common time. That is, no synchronization error due to a communication delay occurs provided that the common times are successively synchronized. This configuration can therefore achieve highly accurate synchronization of the system times.

The communication device 10 acquires the system time not directly from the set time. Instead, the communication device 10 first calculates the time difference and then obtains the system time by calculating the sum of the time difference and the common time. In some conceivable cases, a communication device 10 may measure system time on the basis of only the set time of the system time without using the common time. The communication device 10 according to the embodiment, however, acquires the system time using the common time in measurement of the system time, in the procedure identical to that of the communication device 20. The communication device 10 is therefore capable of highly accurate measurement of the system time, like the communication device 20. Since the communication devices 10 and 20 measure system times in the identical procedure, the communication system 1000 for synchronization of the system times can be readily established and can achieve highly accurate synchronization of the system times between the communication devices 10 and 20.

The communication device 20 repetitively corrects the system time as illustrated in FIG. 11, by calculating the sum of the common time and the time difference indicated by the received time difference data to obtain the system time. The communication device 20 is therefore required to acquire a time difference just once and thus capable of future measurement of system times in synchronization with the system time of the communication device 10. That is, transmission or reception of data between the communication devices 10 and 20 is not required every time when the communication device 20 corrects the system time for synchronization with the communication device 10. For example, after the communication device 10 transmits time difference data to the communication device 20 only at the time of setting of the system time in the communication device 10, the communication devices 10 and 20 are no more required to transmit or receive time difference data to or from each other. This configuration can reduce the communication loads on the communication devices 10 and 20. In addition, the repetitive correction of the system time in the communication device 20 can achieve measurement of the system time at the same rate as the common time as explained above with reference to FIG. 11, and thus prevent an increase in error in the synchronized system times.

The communication device 30 corrects the system time under measurement on the basis of the time data transmitted from either one of the communication devices 10 and 20. The communication device 30 can therefore achieve highly accurate synchronization of the system time with the communication devices 10 and 20.

In detail, the communication device 30 adjusts the rate of time measurement and thereby reduces the time deviation of the system time measured by the communication device 30 itself from the system time indicated by the time data. The communication device 30 is therefore also capable of highly accurate synchronization of the system time with the communication devices 10 and 20 during a period from reception of the time data until reception of subsequent time data.

The above-described embodiment of the disclosure should not be construed as limiting the disclosure.

For example, the number of communication devices 40 and the number of PLCs 100 and 200 should not necessary be the numbers illustrated in FIG. 1 and may be arbitrarily changed.

Although the communication system 1000 constitutes an FA system for controlling machines in the above embodiment, this configuration is a mere example. The communication system 1000 may constitute a monitoring system to collect and record information output from sensors, for example.

Although the storages 13 and 23 store the common time data 132 and 232 indicating the current values of the common time in the above embodiment, this configuration is a mere example. Instead of constant update of the common time data 132 and 232, the storages 13 and 23 may store common time data 132 and 232 updated at specific timings, and generate and output data indicating the current values of the common time on the basis of the stored data in response to a request from the outside, for example. Also, although the storages 13, 23, and 33 store the system time data 133, 233, and 333 indicating the current values of the system time in the above embodiment, this configuration is a mere example. The storages 13, 23, and 33 may generate and output data indicating the current values of the system time in response to a request from the outside.

Although the set time acquirer 11 acquires the set time from the setting device 101 in the above embodiment, this configuration is a mere example. The set time acquirer 11 may acquire set time from a network time protocol (NTP) server, from the communication device 30 via the system bus 401, or from the PLC 200 including a user interface.

In some conceivable cases, no time difference data may be transmitted or received between the communication devices 10 and 20. For example, the communication devices 20 and 30 may provide the communication device 10 with data, which associates information indicating an event, such as an error log, with common time indicating the time of occurrence of this event. Then, the communication device 10 may calculate the system time indicating the time of occurrence of the event from the common time indicated by the received data and the time difference, and provide the user with the calculated system time and the information on the event in association with each other. This communication device 10 can thus associate information on an event occurring in the communication device 20 or 30 with system time also in the case where the communication devices 20 and 30 manage not the system time but the common time.

Although the value of the time difference indicated by the time difference data corresponds to the difference obtained by subtracting the common time from the system time in the above embodiment, this configuration is a mere example. The time difference may be the difference obtained by subtracting the system time from the common time, for example.

The functional configuration of the communication device 10 illustrated in FIG. 5 may be assigned to a unit constituting the PLC 100, and the functional configuration of the communication device 20 illustrated in FIG. 7 may be assigned to a unit constituting the PLC 200. That is, the PLC 100 may perform the functions identical to those of the communication device 10, and the PLC 200 may perform the functions identical to those of the communication device 20.

The functions of the communication device 40 may be achieved by dedicated hardware or an ordinal computer system.

For example, the program P1 to be executed by the processor 41 may be stored in a non-transitory computer-readable recording medium for distribution and then installed in a computer to configure a device for performing the above-explained processes. Conceivable examples of such a non-transitory recording medium include a flexible disk, a compact disc read-only memory (CD-ROM), a digital versatile disc (DVD), and a magneto-optical disc (MO).

The program P1 may also be stored in a disk drive included in a server apparatus on a communication network, represented by the Internet, and may be downloaded into a computer by being superimposed on a carrier wave, for example.

Alternatively, the program P1 may be activated while being transferred through a communication network to perform the above-explained processes.

A server apparatus may execute all or part of the program P1 and a computer may execute the program P1 while transmitting and receiving information on the executed processes to and from the server apparatus via a communication network, to perform the above-explained processes.

In the case where the above-described functions are achieved by an operating system (OS) or by cooperation of the OS and applications, only the components other than the OS may be stored in a medium for distribution or downloaded into a computer, for example.

The functions of the communication device 40 may also be performed by means other than software. Part or all of the functions may be performed by dedicated hardware including circuits.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The disclosure can be appropriately applied to time synchronization via a network.

REFERENCE SIGNS LIST

1000 Communication system
10, 20, 30, 40 Communication device
11 Set time acquirer
12 Time difference calculator
13 Storage
131 Time difference data
132 Common time data
133 System time data
14 Time difference data transmitter
15 Synchronizer
16 Setter
17 Controller
18 Time data transmitter
191 Network I/F
192 System bus I/F
23 Storage
231 Time difference data
232 Common time data
233 System time data
24 Time difference data receiver
25 Synchronizer
26 Setter
27 Controller
28 Time data transmitter
291 Network I/F
292 System bus I/F
31 Setter
311 Adjuster
33 Storage
333 System time data
334 Time deviation data
34 Time data receiver
37 Controller
39 System bus I/F
41 Processor
42 Main storage
43 Auxiliary storage
44 Clock
45 Inputter
46 Outputter
47 Communicator
49 Internal bus
100, 200 PLC
101 Setting device
102 Transmission line
400 Network
401, 402 System bus
L1 to L4, L31, L32 Line
P1 Program

The invention claimed is:
1. A communication system comprising:
a first communication device and a second communication device to share common time after correction of synchronization error including a communication delay with each other via a network, wherein the first communication device comprises:
- an acquirer to acquire set time set by a user;
- a first setter to set the set time as first system time, the first system time being system time of the first communication device; and
- a time difference data transmitter to transmit time difference data to the second communication device, the time difference data indicating a time difference between the common time and the set time, and the second communication device comprises:
- a time difference data receiver to receive the time difference data; and
- a second setter to set a sum of the common time and the time difference indicated by the time difference data as second system time, the second system time being system time of the second communication device.

2. The communication system according to claim 1, wherein the first setter sets the sum of the common time and the time difference as the first system time.

3. The communication system according to claim 2, wherein the second setter repetitively performs correction of the second system time, the correction of the second system time being performed by calculating the sum of the common time and the time difference indicated by the time difference data received by the time difference data receiver.

4. The communication system according to claim 1, further comprising:
- a third communication device connected via a bus to one of the first communication device and the second communication device, wherein the one of the first communication device and the second communication device further comprises a time data transmitter to transmit time data indicating system time via the bus to the third communication device, the third communication device comprises:
- a time data receiver to receive the time data; and
- a third setter to set the system time indicated by the time data as third system time, the third system time being system time of the third communication device, and
- the third setter corrects the third system time under measurement, based on the time data received by the time data receiver.

5. The communication system according to claim 4, wherein the third setter adjusts a rate of measurement of the third system time and thereby reduces a deviation of the third system time under measurement from system time indicated by time data to be received in future by the time data receiver.

6. A communication device to share common time after correction of synchronization error including a communication delay, with another communication device via a network, the communication device comprising:
- a time difference data receiver to receive time difference data from the other communication device, the time difference data indicating a time difference between the common time and set time set by a user; and
- a setter to set a sum of the common time and the time difference indicated by the time difference data as system time of the communication device.

7. A non-transitory recording medium storing a program for a second communication device to share common time after correction of synchronization error including a communication delay with a first communication device via a network, the program causing the second communication device to function as:
- a time difference data receiver to receive time difference data from the first communication device, the time difference data indicating a time difference between the common time and set time set by a user; and
- a setter to set a sum of the common time and the time difference indicated by the time difference data as system time of the second communication device.

* * * * *